(12) United States Patent
Fan et al.

(10) Patent No.: US 11,913,512 B2
(45) Date of Patent: Feb. 27, 2024

(54) VIBRATION SUPPRESSION METHOD FOR SERVO MOTOR AND LOAD MULTISTAGE DRIVE SYSTEM

(71) Applicant: NANJING ESTUN AUTOMATION COMPANY, Jiangsu (CN)

(72) Inventors: Renkai Fan, Jiangsu (CN); Kaifeng Yang, Jiangsu (CN); Dandan Qi, Jiangsu (CN); Wei Qian, Jiangsu (CN); Bo Wu, Jiangsu (CN)

(73) Assignee: NANJING ESTUN AUTOMATION COMPANY, Jiangsu (CN)

( * ) Notice: Subject to any disclaimer, the term of this patent is extended or adjusted under 35 U.S.C. 154(b) by 685 days.

(21) Appl. No.: 17/058,139

(22) PCT Filed: May 13, 2019

(86) PCT No.: PCT/CN2019/086538
§ 371 (c)(1),
(2) Date: Nov. 24, 2020

(87) PCT Pub. No.: WO2019/237868
PCT Pub. Date: Dec. 19, 2019

(65) Prior Publication Data
US 2021/0199173 A1 Jul. 1, 2021

(30) Foreign Application Priority Data

Jun. 13, 2018 (CN) .......................... 201810606309.3

(51) Int. Cl.
*G05B 11/36* (2006.01)
*F16F 15/00* (2006.01)
(Continued)

(52) U.S. Cl.
CPC ............ *F16F 15/002* (2013.01); *B65G 43/02* (2013.01); *G05B 19/404* (2013.01);
(Continued)

(58) Field of Classification Search
CPC .. F16F 15/002; F16F 2228/04; F16F 2230/18; F16F 15/00; B65G 43/02;
(Continued)

(56) References Cited

U.S. PATENT DOCUMENTS

2001/0033146 A1* 10/2001 Kato .................. G05B 5/01
318/568.22

FOREIGN PATENT DOCUMENTS

CN 101576752 11/2009
CN 101576752 A * 11/2009
(Continued)

OTHER PUBLICATIONS

"International Search Report (Form PCT/ISA/210) of PCT/CN2019/086538," dated Aug. 20, 2019, with English translation thereof, pp. 1-4.

*Primary Examiner* — Cortez M Cook
(74) *Attorney, Agent, or Firm* — JCIP GLOBAL INC.

(57) ABSTRACT

A vibration suppression method for a servo motor and a load multistage drive system is provided. For a number N of fixed vibration frequencies and one vibration frequency varying with a load position existing in a multistage drive mechanism, a number of N+1 vibration suppression filters are adopted, and each filter is configured to eliminate a corresponding vibration frequency. Fixed vibration frequencies and a vibration frequency varying with a load position in a multistage drive system are measured by using an offline method, and the varied vibration frequencies are made into a two-dimensional table related to the load positions. The fixed vibration frequencies are eliminated by using fixed-frequency parameter vibration suppression filters; and the varied vibration frequencies are eliminated by using a variable-frequency parameter vibration suppression filter, and
(Continued)

the vibration frequencies are obtained in real time according to the load positions and the two-dimensional table.

1 Claim, 2 Drawing Sheets

(51) Int. Cl.
 *B65G 43/02* (2006.01)
 *G05B 19/404* (2006.01)
(52) U.S. Cl.
 CPC ....... *F16F 2228/04* (2013.01); *F16F 2230/18* (2013.01); *G05B 2219/39195* (2013.01)
(58) Field of Classification Search
 CPC ........ G05B 19/404; G05B 2219/39195; H02P 23/04; H02P 29/028; H02P 29/50; H02P 21/05
 See application file for complete search history.

(56) References Cited

FOREIGN PATENT DOCUMENTS

| | | | |
|---|---|---|---|
| CN | 101584111 | | 11/2009 |
| CN | 103270692 | | 8/2013 |
| CN | 108775373 | | 11/2018 |
| JP | 2005038311 | | 2/2005 |
| JP | 2014204622 | A * | 10/2014 |

* cited by examiner

VIBRATION SUPPRESSION METHOD FOR SERVO MOTOR AND LOAD MULTISTAGE DRIVE SYSTEM

CROSS-REFERENCE TO RELATED APPLICATION

This application is a 371 of international application of PCT application serial no. PCT/CN2019/086538, filed on May 13, 2019, which claims the priority benefit of China application no. 201810606309.3, filed on Jun. 13, 2018. The entirety of each of the above mentioned patent applications is hereby incorporated by reference herein and made a part of this specification.

BACKGROUND

Technical Field

The present invention relates to a vibration suppression method for a servo controller, and specifically to a vibration suppression method for a servo motor and a load multistage drive system.

Description of Related Art

In recent years, a servo control system is widely applied to industrial automation scenarios by virtue of its relatively high dynamic response and control precision. In terms of mechanical connection, the servo control system is prone to vibration during running because of a non-rigid coupling between a servo motor and a load. Use of a vibration suppression filter (usually a notch filter) in a control loop of the servo controller may well suppress the vibration.

In most application scenarios, there are a plurality of stages of drive mechanisms between the servo motor and the load. Vibrations may be generated between the drive mechanisms. A vibration frequency of each stage of drive mechanism is related to inertia of both ends of the drive mechanism and rigidity of the drive mechanism. If the inertia or the drive rigidity varies during movement, the vibration frequency may also change correspondingly.

A lead screw drive system shown in FIG. 1 has a fixed vibration frequency and a variable vibration frequency. A coupling is at a first stage of drive, and inertia of both ends of the coupling and rigidity of the coupling remain unchanged, so that its vibration frequency is fixed. Driving, by a lead screw, a load to move is at a second stage of drive, and because rigidity of the lead screw is related to a load position L, its vibration frequency is related to L.

Extension is made to a multistage drive system, a last stage of drive mechanism driving the load has a vibration frequency related to the load position, and vibration frequencies of drive mechanisms other than the last stage of drive mechanism are fixed.

There are many vibration suppression methods for general-purpose servo products. The methods are commonly characterized in that the vibration frequency in the control loop can be filtered out only when a frequency parameter of the vibration suppression filter is set correctly, so as to suppress the vibration. Currently, there are two methods for setting the frequency parameter of the vibration suppression filter: setting a fixed parameter and setting an adaptive parameter. The fixed parameter setting method does not consider a case that a vibration frequency varies during running. Consequently, the method is only applicable to a simple single-stage drive system. The adaptive parameter setting method is to measure the vibration frequency online and adjust the frequency parameter of the vibration suppression filter in real time during running. The method is relatively complex and its performance depends on accuracy of the online vibration frequency measurement.

SUMMARY

The technical problem to be resolved in the present invention is to overcome defects existing in the prior art and provide a vibration suppression method for a servo motor and a load multistage drive system. Fixed vibration frequencies and a vibration frequency varying with a load position in a multistage drive system are measured by using an offline method, and the varied vibration frequencies are made into a two-dimensional table related to the load positions. The fixed vibration frequencies are eliminated by using fixed-frequency parameter vibration suppression filters; and the varied vibration frequencies are eliminated by using a variable-frequency parameter vibration suppression filter, and the vibration frequencies are obtained in real time according to the load positions and the two-dimensional table by using a linear interpolation method.

The basic idea of the present invention is to aim at a number N of fixed vibration frequencies and one vibration frequency varying with a load position that exist in the multistage drive mechanism. A number N+1 of vibration suppression filters are adopted in the present invention, and each filter is configured to eliminate a corresponding vibration frequency. The fixed vibration frequencies are eliminated by using fixed-frequency parameter vibration suppression filters; and the vibration frequency varying with the load position is eliminated by using a variable-frequency parameter vibration suppression filter.

The present invention provides a vibration suppression method for a servo motor and a load multistage drive system, including following steps.

Step 1: Measuring Vibration Frequencies

Measuring vibration frequencies of stages of drive mechanisms offline, including a number N of fixed vibration frequencies and one variable vibration frequency. For measurement of the variable vibration frequency, successively stopping a load at different positions, recording the load positions and measuring vibration frequencies, and drawing a two-dimensional table according to a relationship between the vibration frequencies and the load positions;

Step 2: Setting Frequency Parameters of Fixed-Parameter Vibration Suppression Filters Selecting a number N of fixed-parameter vibration suppression filters, frequency parameters of which respectively correspond to a number N of fixed vibration frequencies measured in the step 1; and Step 3: Setting a Frequency Parameter of a Variable-Parameter Vibration Suppression Filter Selecting a variable-parameter vibration suppression filter. During movement, calculating, according to a load position and the two-dimensional table drawn in the step 1, a vibration frequency of the position by using a linear interpolation method. Setting the vibration frequency to a frequency parameter of the variable-parameter vibration suppression filter.

In the present invention, fixed vibration frequencies and a vibration frequency varying with a load position in a multistage drive system are measured by using an offline method, and the varied vibration frequencies are made into a two-dimensional table related to the load positions. The fixed vibration frequencies are eliminated by using fixed-frequency parameter vibration suppression filters. The varied vibration frequencies are eliminated by using a variable-frequency parameter vibration suppression filter, and the vibration frequencies are obtained in real time according to the load positions and the two-dimensional table by using a linear interpolation method. The method in the present invention is easy to implement, and can measure the frequency accurately and take both fixed and variable vibration frequencies into account.

DESCRIPTION OF THE EMBODIMENTS

Embodiment

Figure 1:
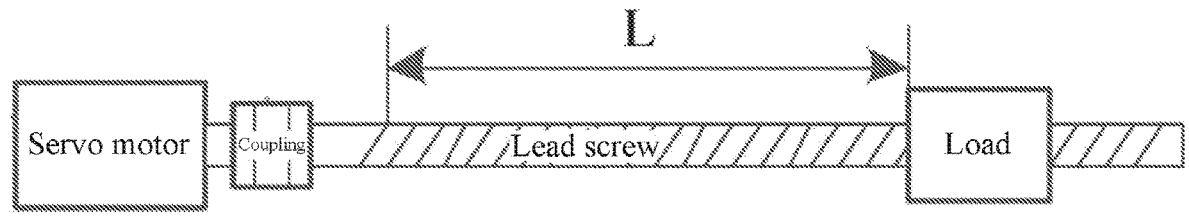
FIG. 1 shows a lead screw drive system.
Figure 2:
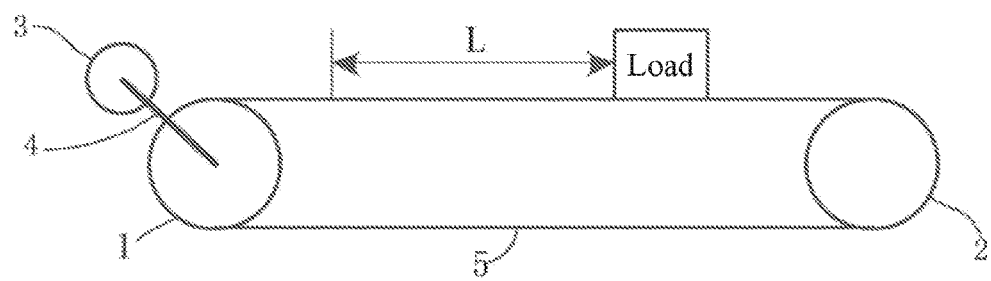
FIG. 2 shows a belt pulley drive system.

FIG. 2 shows a typical belt pulley drive system, and the system has a fixed vibration frequency and a variable vibration frequency. There is a rigid coupling 4 and no vibration between a servo motor 3 and a synchronizing wheel 1. A drive mechanism formed by the synchronizing wheel 1, a synchronizing wheel 2, and a belt has a fixed vibration frequency. A drive mechanism formed by the synchronizing wheel 1, the belt 5 and a load has a variable vibration frequency related to a load position.

A vibration suppression filter adopted in this embodiment is a standard notch filter, a transfer function of which is as follows.

$$G(s) = \frac{s^2 + \omega_n^2}{s^2 + 2\zeta\omega_n s + \omega_n^2}$$

Wherein, $\omega_n$ is a center frequency of the notch filter, and $\zeta$ is a bandwidth of the notch filter.

Implementation steps are as follows.

Step 1: Measuring Vibration Frequencies

Figure 3:
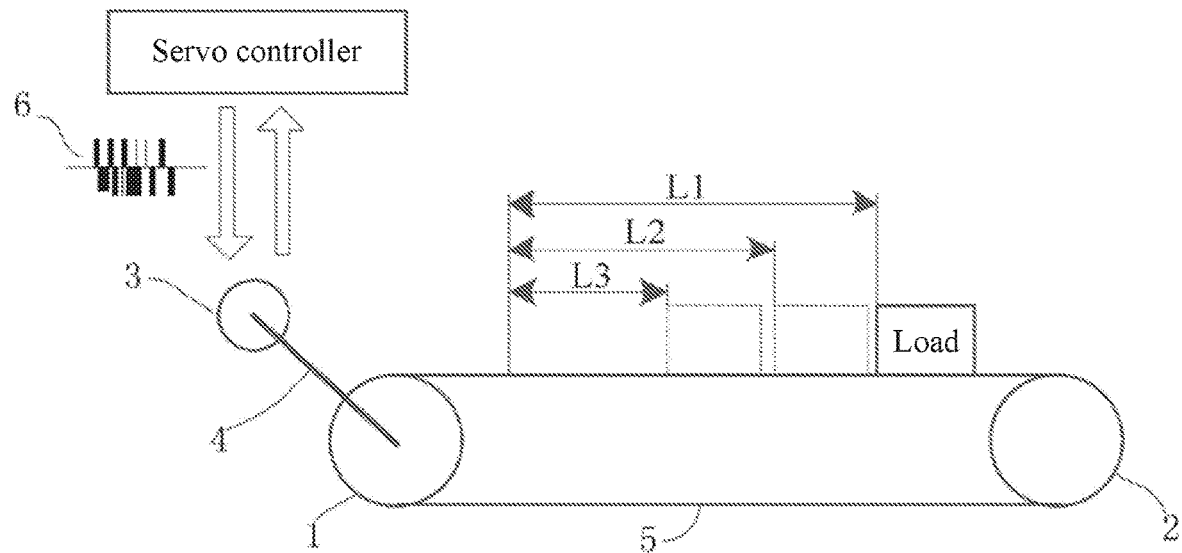
FIG. 3 is a schematic diagram of measuring a vibration frequency of a belt pulley drive system.
Figure 4:
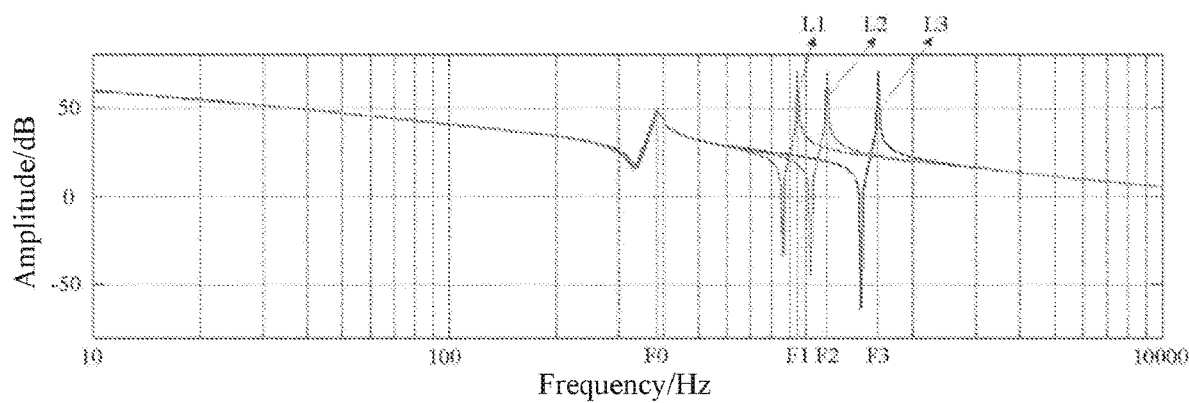
FIG. 4 shows an amplitude-frequency curve of a belt pulley drive system.
Figure 5:
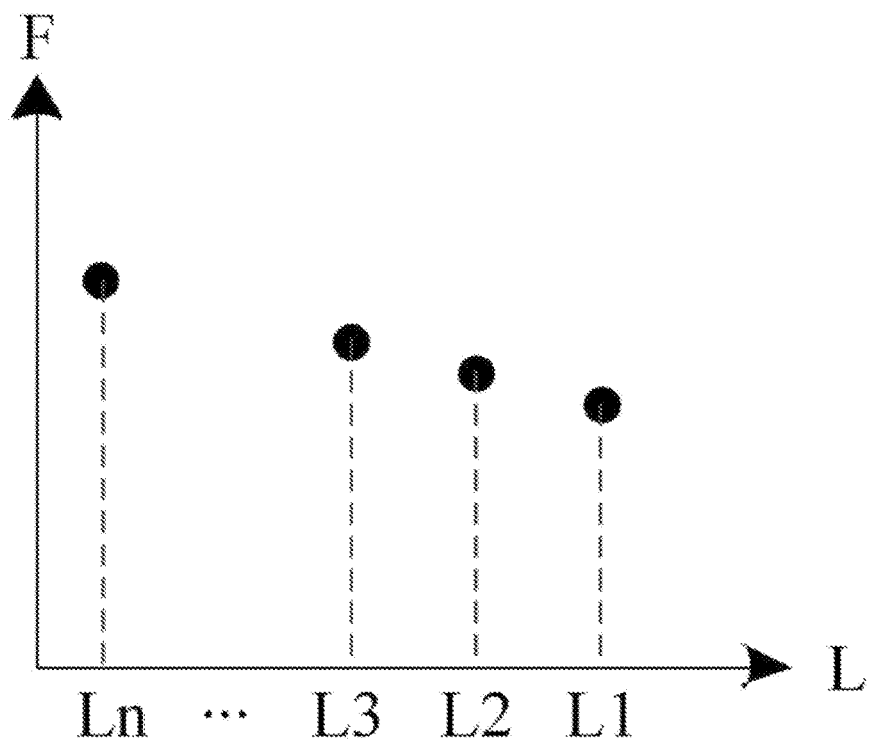
FIG. 5 shows a relationship between a vibration frequency and a load position.

As shown in FIG. 3, a load is stopped at positions of L1, L2, and L3 respectively, and a servo controller is used to give a given torque 6 with relatively rich frequency components, and detect a feedback speed 7 of the motor. Fourier transform is performed on the feedback speed, and an amplitude-frequency curve thereof is drawn, as shown in FIG. 4. There is a fixed vibration frequency F0 and variable vibration frequencies F1, F2, and F3 in the figure. Vibration frequencies of more positions may be measured by repeating this step, and a relationship between the variable vibration frequencies and the positions is made into a two-dimensional table. FIG. 5 shows a relationship between the measured vibration frequencies and the positions.

Step 2: Setting a Notch Filter with a Fixed Center Frequency

A notch filter with a fixed center frequency is adopted. The center frequency thereof is set to the fixed vibration frequency F0.

Step 3: Setting a notch filter with a variable center frequency

A notch filter with a variable center frequency is adopted. During movement, a vibration frequency F of a load position L is calculated according to the position by using a linear interpolation method; and the vibration frequency is set to a center frequency of the notch filter.

According to the method of the present invention, the fixed-parameter vibration suppression filter and the variable-parameter vibration suppression filter are used respectively, and do not affect each other. The vibration frequency is measured in an offline manner. The implementation is relatively simple and may obtain a more accurate vibration frequency. When measuring the vibration frequency offline, only a servo controller is used to give a given torque with relatively rich frequency components, and detect a feedback speed of the motor, and no extra measurement device is required. The variable vibration frequencies are made into a two-dimensional table, and when the system is running, vibration frequencies of different load positions are obtained by using a table look-up method and a linear interpolation method. Therefore, the method is applicable to a multistage drive system with variable vibration frequencies.

A number N+1 of vibration frequencies in the multistage drive system are eliminated by using a number N+1 of vibration suppression filters. A number N of fixed-parameter vibration suppression filters eliminate a number N of fixed vibration frequencies; and one variable-parameter vibration suppression filter eliminates one variable vibration frequency. During online running, frequency parameters of the fixed-parameter vibration suppression filters are unchanged, and vibration frequencies of different load positions are calculated according to the frequency parameter of the variable-parameter vibration suppression filter by using a linear interpolation method.

What is claimed is:

1. A vibration suppression method for a servo motor and a load multistage drive system, comprising following steps:
   step 1: measuring vibration frequencies, including measuring vibration frequencies of stages of drive mechanisms offline, comprising a number N of fixed vibration frequencies and one variable vibration frequency; and for measurement of the variable vibration frequency, successively stopping a load at different positions, recording load positions and measuring vibration frequencies, and drawing a two-dimensional table according to a relationship between the vibration frequencies and the load positions;
   step 2: setting frequency parameters of fixed-parameter vibration suppression filters, including selecting a number N of fixed-parameter vibration suppression filters, wherein frequency parameters of which respectively correspond to the number N of fixed vibration frequencies measured in the step 1; and
   step 3_ setting a frequency parameter of a variable-parameter vibration suppression filter, including selecting a variable-parameter vibration suppression filter; during movement, calculating, according to the load positions and the two-dimensional table drawn in the step 1, a vibration frequency of the position by using a linear interpolation method; and setting the vibration frequency to a frequency parameter of the variable-parameter vibration suppression filter.

* * * * *